United States Patent
Jaeger et al.

(10) Patent No.: US 10,814,930 B2
(45) Date of Patent: Oct. 27, 2020

(54) INLAY ELEMENT FOR A FIBER-REINFORCED TUBE

(71) Applicant: Bayerische Motoren Werke Aktiengesellschaft, Munich (DE)

(72) Inventors: Elmar Jaeger, Kempten im Allgaeu (DE); Gerrit Heyl, Gauting (DE); Rudolf Schrupp, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 335 days.

(21) Appl. No.: 15/482,866

(22) Filed: Apr. 10, 2017

(65) Prior Publication Data
US 2017/0210441 A1 Jul. 27, 2017

Related U.S. Application Data

(63) Continuation of application No. PCT/EP2015/077593, filed on Nov. 25, 2015.

(30) Foreign Application Priority Data

Jan. 16, 2015 (DE) .......................... 10 2015 200 625

(51) Int. Cl.
*B62K 21/18* (2006.01)
*B29C 70/86* (2006.01)
(Continued)

(52) U.S. Cl.
CPC ............ *B62K 21/18* (2013.01); *B29C 70/021* (2013.01); *B29C 70/86* (2013.01); *B62K 21/12* (2013.01);
(Continued)

(58) Field of Classification Search
CPC ...... B62K 21/18; B62K 21/12; B29C 70/021; B29K 2105/08
See application file for complete search history.

(56) References Cited

U.S. PATENT DOCUMENTS 610,132 A * 8/1898 Goodridge ................. 403/359.1
4,483,731 A 11/1984 Dohle et al.
(Continued)

FOREIGN PATENT DOCUMENTS

CN 200948831 Y 9/2007
CN 201026980 Y 2/2008
(Continued)

OTHER PUBLICATIONS

German-language Search Report issued in counterpart German Application No. 10 2015 200 625.5 dated Nov. 13, 2015 with partial English translation (14 pages).
(Continued)

*Primary Examiner* — Vicky A Johnson
(74) *Attorney, Agent, or Firm* — Crowell & Moring LLP

(57) ABSTRACT

An inlay element to be arranged in a clamping region of a fiber-reinforced tube has an elongate round body, which has an outer lateral surface on which there are arranged at least two protrusions extending radially away from the lateral surface. The protrusions each have an end face remote from the round body for the areal application of an external clamping force. A tube arrangement is provided with the fiber-reinforced tube.

10 Claims, 3 Drawing Sheets

(51) Int. Cl.
   *B62K 21/12*   (2006.01)
   *B29C 70/02*   (2006.01)
   *B29K 105/08*  (2006.01)
   *B29L 31/30*   (2006.01)

(52) U.S. Cl.
   CPC ....... *B29K 2105/08* (2013.01); *B29L 2031/30* (2013.01)

(56) References Cited

U.S. PATENT DOCUMENTS

| | | | | |
|---|---|---|---|---|
| 4,616,949 | A | * | 10/1986 | Kellner ............... B62K 21/18 403/104 |
| 5,199,322 | A | * | 4/1993 | Wu ..................... B62K 21/12 403/292 |
| 9,725,133 | B2 | * | 8/2017 | Staples ................ B62M 3/00 |
| 2005/0048266 | A1 | | 3/2005 | Reif et al. |
| 2009/0049949 | A1 | * | 2/2009 | Chen ................... B62K 21/12 74/551.1 |
| 2010/0196637 | A1 | | 8/2010 | Lippert et al. |
| 2010/0320814 | A1 | | 12/2010 | Singenberger et al. |
| 2012/0066994 | A1 | | 3/2012 | Gibson et al. |
| 2017/0210441 | A1 | * | 7/2017 | Jaeger ................. B29C 70/86 |

FOREIGN PATENT DOCUMENTS

| | | |
|---|---|---|
| CN | 201268352 Y | 7/2009 |
| DE | 31 13 791 A1 | 2/1982 |
| DE | 693 04 689 T2 | 4/1997 |
| DE | 10 2007 015 909 A1 | 10/2008 |
| DE | 10 2008 023 629 A1 | 11/2009 |
| EP | 1 048 442 A1 | 11/2000 |
| EP | 1 864 893 A2 | 12/2007 |
| WO | WO 93/22127 A1 | 11/1993 |

OTHER PUBLICATIONS

International Search Report (PCT/ISA/210) issued in PCT Application No. PCT/EP2015/077593 dated Feb. 26, 2016 with English translation (8 pages).
German-language Written Opinion (PCT/ISA/237) issued in PCT Application No. PCT/EP2015/077593 dated Feb. 26, 2016 (5 pages).
Chinese-language Office Action issued in counterpart Chinese Application No. 201580052987.4 dated May 25, 2018 with English translation (12 pages).
English translation of Chinese Office Action issued in counterpart Chinese Application No. 201580052987.4 dated Dec. 28, 2018 (three pages).

* cited by examiner

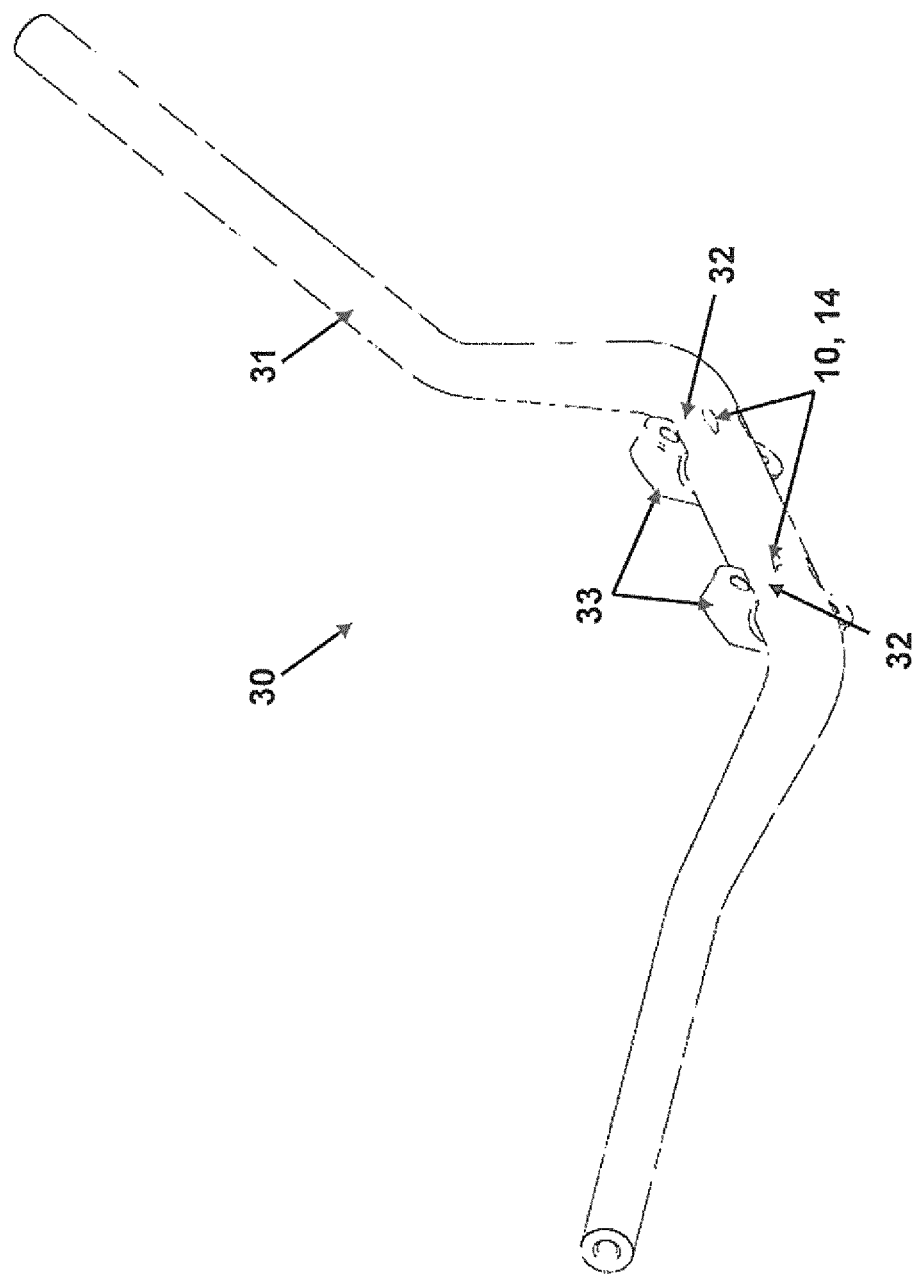

INLAY ELEMENT FOR A FIBER-REINFORCED TUBE

CROSS REFERENCE TO RELATED APPLICATIONS

This application is a continuation of PCT International Application No. PCT/EP2015/077593, filed Nov. 25, 2015, which claims priority under 35 U.S.C. § 119 from German Patent Application No. 10 2015 200 625.5, filed Jan. 16, 2015, the entire disclosures of which are herein expressly incorporated by reference.

BACKGROUND AND SUMMARY OF THE INVENTION

The invention relates to an inlay element to be arranged in a clamping region of a fiber-reinforced tube, to a correspondingly strengthened fiber-reinforced tube and to a method for its production.

Fiber-reinforced tubes are used in numerous fields of application. Compared to tubes made of metallic materials, they have, among others, a special advantage relative to weight, while rigidity and design freedom are simultaneously high.

However, the stationary linkage of the fiber-reinforced tubes to other components represents a particular challenge. A clamping of the tube in defined clamping regions, which is possible in the case of metal tubes, can take place only to a limited extent because of the special material properties of the fiber composite of the fiber-reinforced tubes. Under a high effect of a clamping force, the material is locally compressed, whereby an undesirable setting behavior or even a delamination may occur. In both cases, a structure of the tube is damaged and rigidity is considerably reduced.

For example, the use of fiber-reinforced tubes as handlebar tubes for motorcycles offers, in addition to the above-mentioned weight-related advantages, also the possibility of providing, by way of a suitable fiber composite material or a suitable fiber composite mixture, a particularly favorable vibration behavior of the handlebar, which clearly reduces the vibrations acting upon the driver during the drive. However, because of the above-mentioned risk of damage, a clamping by way of the previous clamping arrangements is not possible. Instead, costly fastening devices or a special coordination of the fiber material have to be implemented.

It is therefore an object of the invention to permit a clamping, which is as easy and advantageous as possible, of a fiber-reinforced tube.

This and other objects are achieved by an inlay element to be arranged in a clamping region of a fiber-reinforced tube, a fiber-reinforced tube having the inlay and a method of producing the fiber-reinforced tube, in accordance with embodiments of the invention.

Accordingly, an inlay element is provided that is to be arranged in a clamping region of a fiber-reinforced tube, which inlay element has an oblong round body having an outer lateral surface, on which at least two protrusions are arranged. The protrusions extend radially away from the lateral surface. In addition, the protrusions each have an end face facing away from the round body, for the areal application of an external clamping force.

This means that the inlay element can be provided for being arranged in clamping regions of a fiber-reinforced tube, in order to locally reinforce the latter and to absorb the external clamping forces in a suitable manner. For this purpose, the protrusions are provided on the inlay element and can be acted upon by the external clamping force on their end face, in order to introduce this clamping force into the inlay element or provide a counterforce to the clamping force. Rotationally symmetrical shapes, which particularly extend in a longitudinal direction, can be used as the oblong round body.

Thus, the round body is, for example, a cylinder or a truncated cone. Furthermore, the round body may have a massive construction or may be constructed as a hollow body. A sleeve-type round body with a cross-section that is constant in the longitudinal direction or with a cross-section that tapers in the longitudinal direction is particularly preferred.

According to preferred embodiments, the protrusions each have a diamond-shaped, oval, polygonal or round cross-section. As a result of their shape, these cross-sections, when appropriately dimensioned, permit a particularly advantageous course of fiber material that is used for producing the fiber-reinforced tube. The fibers contained therein, as a result of the described cross-sectional shapes, can be easily laid around the above-mentioned protrusions so that the fiber materials avoid the protrusions. An interruption or a significant deflection of the fibers, which would lead to a local weakening of the component, are avoided in this manner.

The diamond-shaped cross-sectional form, for example, is advantageous. At least for fibers, which along the longitudinal dimension (0°) of the diamonds or at angles smaller than +/−45° are aligned with respect to this longitudinal direction, this shape permits an advantageous spreading-out of the fiber material, which simultaneously avoids abrupt direction changes of the fibers and instead permits a slight deflection of the fibers.

The lateral surface preferably has a first and a second surface half, in which case, an axis of symmetry of the round body is situated in an imaginary separating plane, which separates the two surface halves only virtually from one another. At least one of the protrusions, preferably at least two protrusions, is/are assigned to each surface half.

This means that the lateral surface can be divided at least theoretically into the two halves of the lateral shell, and each of the halves has the at least one protrusion. The two surface halves are arranged such that the axis of rotation of the round body, which simultaneously forms its axis of symmetry, is situated within the virtual separating plane. As a result, the lateral surface is divided into two equal halves along the axis of symmetry, which halves are arranged opposite one another. Each surface half therefore forms one surface respectively, which extends by 180° in the circumferential direction and is directly adjoined by the second half in the circumferential direction. This division should only be understood as a "theoretical" or virtual division, which means that the two lateral shell halves do not actually have to be separated but may be constructed in one piece with one another and with the round body.

The embodiment provides the possibility of arranging at least one protrusion respectively on each surface half, so that a clamping force is introduced by way of the protrusion or protrusions or protrusions of the first surface half, and the clamping force can be supported by way of the protrusion or protrusions of the opposite second surface half when, in the installed condition, the tube is acted upon by the external clamping force.

In addition, the inlay element may consist of metal, particularly stainless steel, plastic, fiber-reinforced plastic or ceramics. For reasons of possible corrosion avoidance, the inlay element should preferably be produced of a compatible material, or at least a galvanic insulation should be provided between the inlay element and the tube.

Furthermore, a tube arrangement having a fiber-reinforced tube and an inlay element are disclosed, wherein the tube has at least one clamping region for the application of an external clamping force, and the inlay element is arranged in the clamping region such that the at least two protrusions extend radially into a wall of the tube. In this case, the inlay element is constructed according to the specification.

The clamping region preferably has at least one inlay element. Its protrusions extend into the wall of the tube, so that the inlay element is fixed in the intended position. A clamping force introduced into the clamping region is supported by way of the protrusions of the inlay element, so that the wall of the tube consisting of fiber material will be relieved of the clamping forces. A clamping therefore takes place depending on the height of the protrusions partially or completely by way of the inlay element and not (completely) by way of the wall of the fiber-reinforced tube.

For this purpose, a respective height of the protrusions is preferably selected to be less than or equal to a wall thickness of the tube. This means that the protrusions extend into the wall of the tube in such a fashion that they project only partially or to a defined depth into the wall or extend completely through the latter. For the preferred case that the height of the protrusions is equal to the thickness of the wall, the end face of the protrusions is flush with the lateral surface of the round body.

Should the height of the protrusions be less than the thickness of the wall, the end face of the protrusion should preferably also be exposed and not be covered by a wall. In this manner, a direct application of a clamping force can be made possible without jamming the fiber composite material between the end face and a clamping device applying the clamping force and thereby possibly damaging the fiber composite material.

In this case, the height of the protrusions may preferably be chosen such that, at least in a later clamped-in state in which the fiber material was compressed by the clamping force to a defined extent, the end face of the protrusion extends flush with the generated "compressed" lateral surface, in order to prevent a further compression of the fiber composite material and instead support the clamping force by way of the protrusions.

If the protrusions already have a height which corresponds to the (uncompressed) wall thickness, thus, the height of the protrusions is equal to the wall thickness, the clamping force can already be supported by the inlay element, without a compression of the fiber-reinforced tube.

The tube or the entire tube arrangement can, for example, be used as a handle bar tube of a vehicle, including a motorcycle, a scooter, a motor scooter or another motorcycle-type vehicle.

In addition, a method of producing a tube arrangement is disclosed, which has the following steps:
(i) providing a shaping core element,
(ii) arranging a number of inlay elements on the core element
(iii) producing a fiber-reinforced tube, which encloses the core element and the inlay elements such that, at least in a hardened state of the tube, protrusions of the inlay elements extend through a wall of the produced tube, so that a respective end face of the protrusions is accessible to an areal application by an external clamping force.

Furthermore, the core element can be inflatable for producing the fiber-reinforced tube, and the method may comprise a step of filling the core with a fluid, particularly a gaseous or liquid fluid, for increasing the volume of the core. In this manner, the tube to be produced can be inflated against a forming tool for producing a desired shape.

In addition, the step of producing the fiber-reinforced tube may include an enclosing of the core element and of the inlay elements by means of fiber material, particularly impregnated fiber material or non-impregnated fiber material and/or a step of impregnating the fiber material with a matrix, particularly in an RTM process and/or a step for hardening the produced tube.

The enclosing step may also include a wrapping-around, weaving-around and/or braiding-around of fiber material, particularly by use of fiber rovings, woven fabrics, fleeces, braidings, knitted fabrics, crocheted fabrics.

Accordingly, prepregs, for example, can be wrapped or braided around the tube. As an alternative, braiding dry, non-pre-impregnated fibers or semi-finished fibers around the tube is contemplated, which subsequently are placed in a pressing tool for impregnating and are processed.

In each case, the inlay elements are fixedly integrated in the fiber-reinforced tube during the production.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a view of a tube arrangement having an inlay element according to FIG. 1.

DETAILED DESCRIPTION OF THE DRAWINGS

Figure 1:
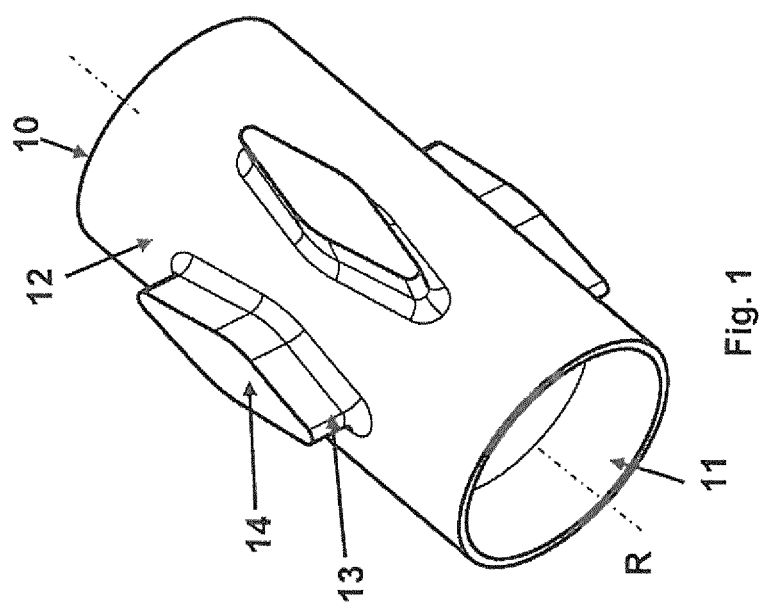
FIG. 1 is a perspective view of a first embodiment of an inlay element.

FIG. 1 illustrates a first embodiment of an inlay element 10 to be arranged in a clamping region of a fiber-reinforced tube (not shown). The inlay element 10 has an oblong round body 11 with an outer lateral surface 12. On this lateral surface 12, a number of protrusions 13 is arranged, which extend radially away from the lateral surface 12. Each of these protrusions 13 has one end face 14 respectively, which faces away from the round body 11 and which can be acted upon by an external clamping force. In an installed condition, the clamping force is introduced by way of these end faces 14 of the protrusions 13 into the inlay element and is supported.

Figure 6:
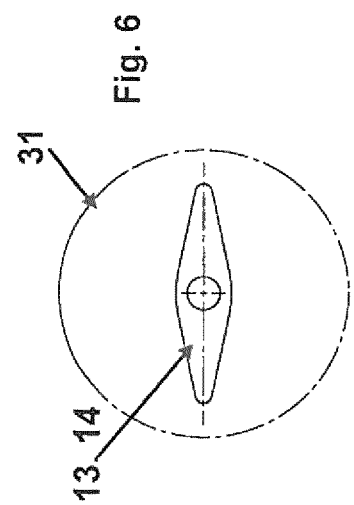
FIG. 6 is a top view of a protrusion of the inlay element used in the tube arrangement of FIG. 4.

In the illustrated embodiment, the protrusions 13 are arranged in a row oriented in the circumferential direction of the inlay element 10. It is understood that more than one row can also be provided in the same manner. Likewise, the number of protrusions as well as the illustrated spacing of the protrusions with respect to one another is to be adapted, particularly in view of the loads to be expected. In addition, the illustrated protrusions 13 have a diamond-shaped cross-section (shown also as a detail in FIG. 6) whose corners are optimally rounded in order to provide an optimal fiber course, which, in the installed condition, reduces or even avoids abrupt and unsteady fiber courses of the fiber-reinforced tube.

Figure 2:
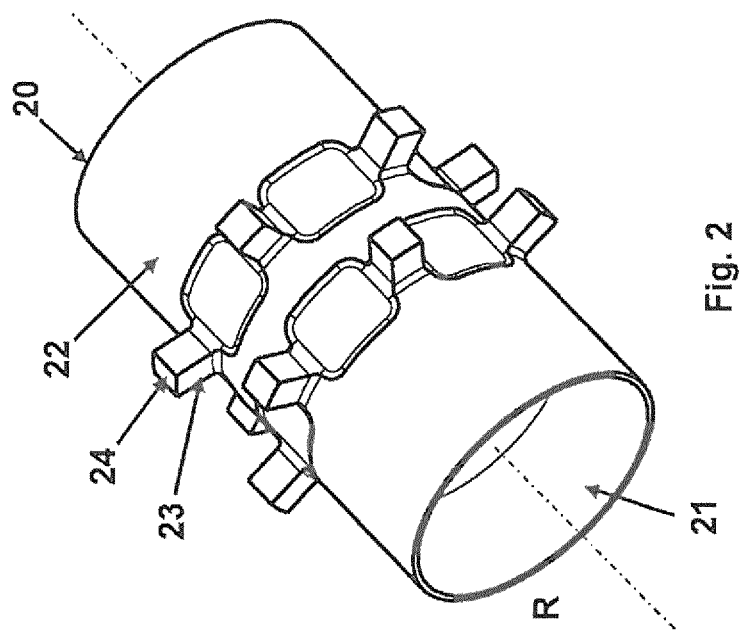
FIG. 2 is a perspective view of a second embodiment of an inlay element.

FIG. 2 shows an alternative embodiment of an inlay element 20. This inlay element also has an oblong round body 21 with a number of protrusions 23, which are arranged on a lateral surface 22, each of which has an end face 24. In this case, the protrusions 23 are arranged in two parallel rows with respect to one another in the circumferential direction, the respective positions of the protrusions being arranged in an offset manner with respect to the neighboring protrusions 2 of the respective other row. In other words, the two rows are rotated with respect to one another by a defined angle of rotation in the circumferential direction of the round body 21. This permits an improved fiber course for the fiber composite material of a fiber-reinforced tube (not shown) provided with this inlay element 20. However, it is understood that this embodiment of the protrusions 23 can also be provided in only one row or in more than two rows.

In FIGS. 1 and 2, the round body 11, 21 is shown as a cylinder having an axis of symmetry R. However, likewise a different geometrical shape may be provided, such as a truncated cone. Furthermore, the round body 11, 21 is constructed as a hollow body, but a massive, and therefore not hollow, implementation is also contemplated.

In addition to the diamond-shaped and square cross-sections of the protrusions 13, 23 illustrated in FIGS. 1 and 2, other cross-sectional shapes, such as oval, polygonal or round cross-sections can naturally also be used.

The inlay element 10, 20 preferably consists of metal, plastic, fiber-reinforced plastic or ceramics. In addition, the inlay element 10, 20 may be constructed in one piece, or be composed of individual components, for example, by the material bonding of separately produced protrusions 13, 23 or by the injection-welding of corresponding protrusions 13, 23.

FIG. 3 illustrates a tube arrangement 30 having a fiber-reinforced tube 31 and two inlay elements 10. The tube 31 has two clamping regions 32 for the stationary fastening of the tube by way of an application of an external clamping force. A respective clamping device is at least partially shown with one clamping jaw 33 respectively. The inlay elements 10 are arranged in such a manner in the respective clamping region 32 that the protrusions 13 extend radially into a wall of the tube 31. In the illustrated example, the inlay elements 10 are designed according to FIG. 1, so that, with respect to their construction, reference is made to the description concerning FIG. 1.

The fiber-reinforced tube 31 is constructed, for example, as a handlebar tube of a vehicle, including a motorcycle, a scooter, a motor scooter or another motorcycle-type vehicle.

Figure 4:
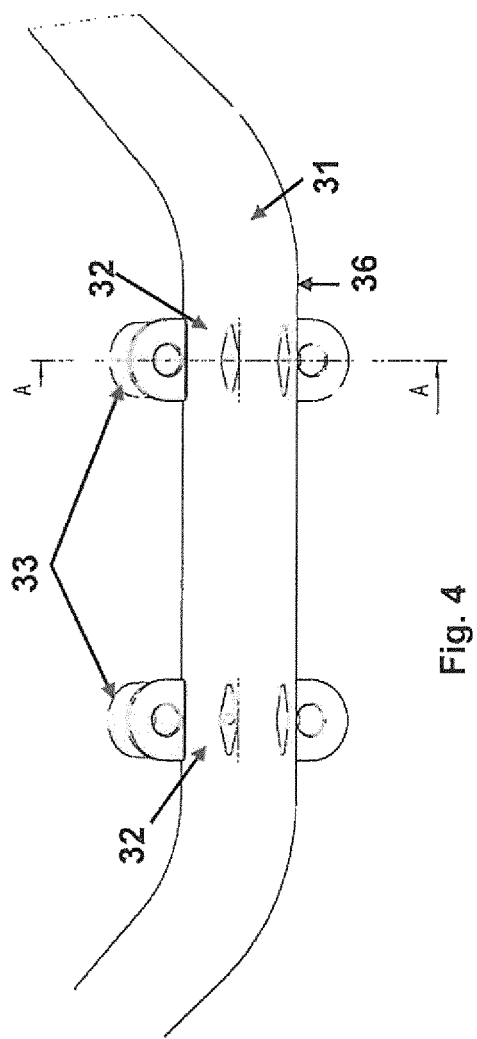
FIG. 4 is a view of a detail of the clamping regions of the tube arrangement of FIG. 3.

FIG. 4 is a detailed view of the clamping regions 32 of the tube arrangement of FIG. 3. It can be recognized how the protrusions 13 of the inlay elements 10 extend through the wall of the fiber-reinforced tube 31, and the end face 14 of the protrusions 13 is visible on an outer surface of the tube. In this manner, a clamping force can be introduced directly into the protrusions 13, so that compression of or damage to the tube 31 is avoided.

Figure 5:
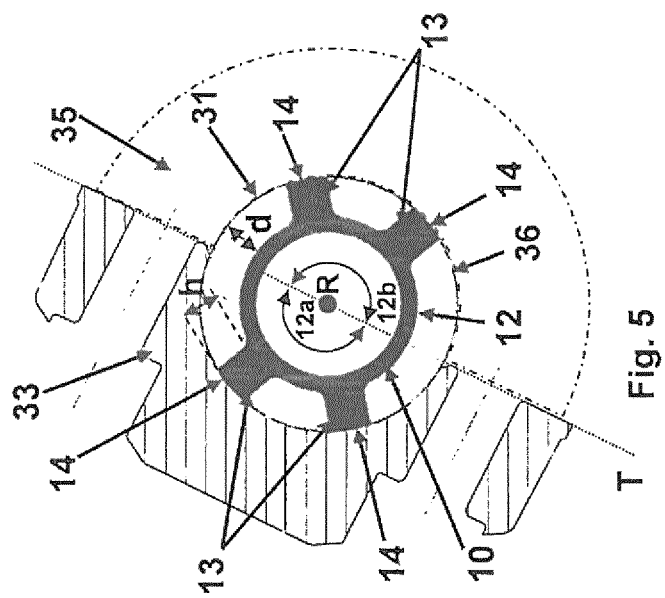
FIG. 5 is a sectional view of a clamping region of FIG. 4.

FIG. 5 is a sectional view A-A of one of the two clamping regions 32 illustrated in FIG. 4. It can be recognized here that a respective height h of the protrusions 13 is selected that is (essentially) equal to a wall thickness d of the tube 31. The first clamping jaw 33 and an, only schematically outlined, second clamping jaw 35 (indicated by a broken line) of a clamping device, otherwise not shown in detail, therefore lie flat on an outer surface 36 of the tube 31 and simultaneously on the end faces 14 of the respective protrusions 13.

The sectional view also shows that the protrusions 13 are not distributed in a regular fashion over the lateral surface 12 of the inlay element 10. Instead, two protrusions 13 point in the direction of the first clamping jaw 33, and two additional protrusions 13 point in the direction of the second clamping jaw 35.

In other words, the lateral surface 12 of the inlay element 10 has a first surface half 12a and a second surface half 12b, the axis of symmetry R (perpendicular to the plane of the drawing) of the round body 11 being situated in an imaginary virtual separating plane T, which separates the two surface halves 12a, 12b from one another. Two of the protrusions 13 are assigned to each surface half 12a, 12b. In this case, the imaginary separating plane T is identical with an actual partition of the first clamping jaw 33 and the second clamping jaw 35. Each of the two surface halves 12a, 12b therefore faces one clamping jaw respectively. However, the two surface halves are obtained only from an imaginary division for understanding the arrangement possibility of the protrusions. In contrast, the lateral surface 12 does not actually have to be divided into these two halves but can rather be constructed in one piece.

In the concrete embodiment, the protrusions 13 are arranged such that, in each case, one protrusion 13 arranged on the first surface half 12a and one protrusion 13 arranged on the second surface half 12b are arranged diametrically opposite with respect to the axis of rotation R. A clamping force introduced by way of the first clamping jaw 33 and the second clamping jaw 35 can thereby be supported by the inlay element 10, without any application of the clamping force to the fiber composite material of the tube 31 and without any damage to the fiber composite material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inlay element to be arranged in a clamping region of a fiber-reinforced tube, comprising:
    an oblong round body which has an outer lateral surface; and
    at least two protrusions arranged on the outer lateral surface, the at least two protrusions extending radially away from the lateral surface, wherein
    the protrusions each have a radially outward facing end face facing away from the round body for areal application of an external clamping force to said end face and corners that are rounded, thereby reducing or avoiding abrupt and unsteady fiber courses of the fiber-reinforced tube.

2. The inlay element according to claim 1, wherein the round body is a cylinder or a truncated cone.

3. The inlay element according to claim 2, wherein the round body has a massive construction or is constructed as a hollow body.

4. The inlay element according to claim 3, wherein the protrusions each have a polygonal or diamond-shaped cross-section.

5. The inlay element according to claim 1, wherein the round body has a massive construction or is constructed as a hollow body.

6. The inlay element according to claim 1, wherein the protrusions each have a polygonal or diamond-shaped cross-section.

7. The inlay element according to claim 1, wherein
the outer lateral surface has a first surface half and a second surface half,
an axis of symmetry of the round body is situated in an imaginary separating plane, which separates the two surface halves from one another, and
at least one of the protrusions is assigned to each surface half.

8. The inlay element according to claim 7, wherein at least two protrusions are assigned to each surface half.

9. The inlay element according to claim 1, wherein the inlay element is made of metal, plastic, fiber-reinforced plastic or ceramics.

10. The inlay element according to claim 1, wherein the areal application of the external clamping force is an application of the clamping force by a camping jaw lying flat on each said end face of the protrusions.

\* \* \* \* \*